May 2, 1939.  C. STEFFEN  2,156,883
DOUBLETREE
Filed March 22, 1937
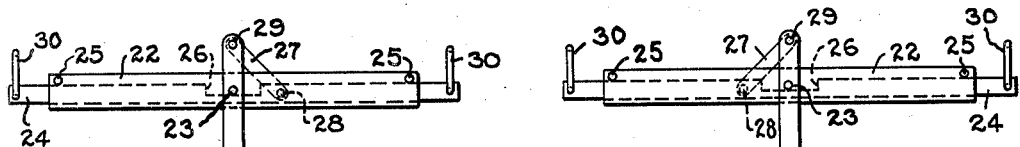
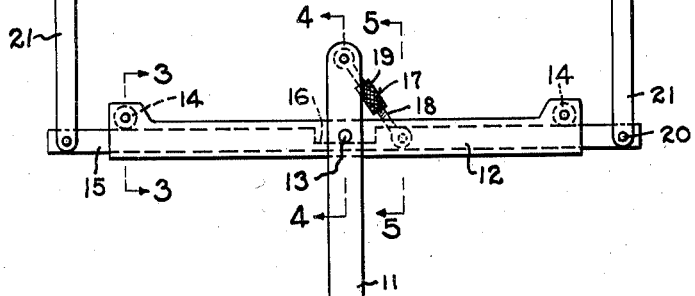
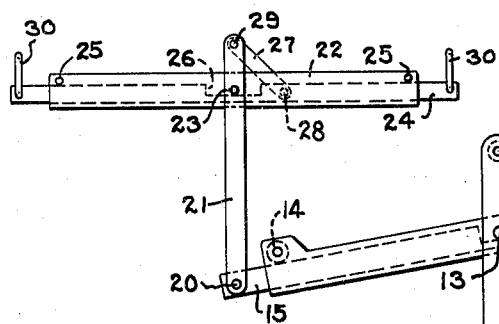
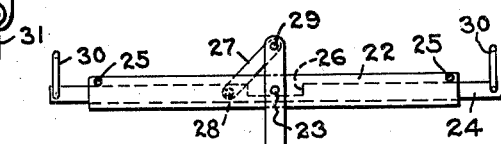
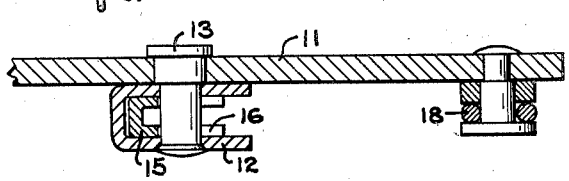
INVENTOR.
CLARENCE STEFFEN.
BY
*H. C. Kavel*
ATTORNEY.

Patented May 2, 1939

2,156,883

UNITED STATES PATENT OFFICE 2,156,883

DOUBLETREE

Clarence Steffen, Cold Spring, Ky.

Application March 22, 1937, Serial No. 132,334

3 Claims. (Cl. 278—20)

My invention relates to a new and useful doubletree of a type primarily useful in connection with farm implements.

The object of my invention is to provide means for decreasing the distance from the point of pivot to the singletree link on the lagging draft-animal and increasing the distance from the point of pivot to the singletree link on the forward animal. A further object is to compensate for the shoulder action of the animals. A still further object is to provide means for adjusting the leverage to equalize the load relative to the respective strength of the animals.

My invention will be further readily understood from the following description and claims, and from the drawing, in which latter:

Fig. 1 is a plan view of my imprved doubletree.

Fig. 2 is a similar view with the singletrees shifted to an unequal position.

Fig. 3 is a sectional view of a detail, taken in the plane of the line 3—3 of Fig. 1.

Fig. 4 is a sectional view of the center pivot, taken in the plane of the line 4—4 of Fig. 1, and Fig. 5 is a sectional view, taken in the plane of the line 5—5 of Fig. 1.

My improved construction comprises a pull-bar 11 to which a cross-bar 12 of U formation is pivoted as by the bolt 13. A pair of rollers 14 are mounted in the ends of the cross-bar 12. The main tree 15 is slidable endwise in the cross-bar 12, being confined therein by the rollers 14. This tree is recessed as at 16 to prevent interference with the pivot 13. Pivoted to the forward end of the pull-bar 11 and to the main tree is a turnbuckle linkage 17 comprising a pair of eye bolts 18 having right and left hand threads respectively received in the nut 19, the purpose of which will be hereinafter more fully explained.

Pivoted as at 20 to the outer ends of the main tree are a pair of links 21 to which cross-bars 22 are pivoted as at 23. Singletrees 24 are slidable in these cross-bars, retained therein by pins 25. These singletrees are also recessed as at 26 to prevent interference with the pivot bolt 23. Links 27 are pivoted to the singletrees as at 28 and to the forward end of the links 21 as at 29. Draft loops 30 are attached to the respective ends of the singletrees 24. A U bolt 31 is pivoted to the end of the pull-bar 11 for attachment of the farm implement.

I have found that in using a pair of draft animals, one will usually drop back thus increasing the load on the forward animal, while in my improved construction the animal lagging behind receives the increased load, as indicated in Fig. 2, for such lagging causes a shift in the doubletree bar 15, whereby the main tree 15 extends further away from the pivot 13 on the side of the horse in advance and decreases the distance from the pivot 13 to the link 21 on the side of the lagging horse, thus the leverage is changed and the load is shifted in proportion to the distance the horse lags. The further one horse lags the greater the load on that side. Thus animals having a tendency to lag will soon learn to keep pace with the other animal.

If draft animals are used wherein one is larger or of greater strength, the turnbuckle can be adjusted to shift the doubletree in normal position to the side of the weaker animal to relieve the load on that animal.

I have also found that the implement being drawn by the animals follows a true course and is not rocked back and forth as is the case with the ordinary doubletree.

In operation, the bar 11 and the links 21 maintain a true forward positon and the rocking action on the cross-bars 12 and 22 causes the trees to shift due to the action of the links 17 and 27.

The sliding bar in the singletrees permits the load to shift with the shoulder action of the animal and as each stride is taken the load is equalized on each shoulder. These singletrees can be detached by removing the pivot 20 and used on a single animal with improved pulling force being applied to the implement.

Having thus fully described my invention, what I claim as new and desire to secure by Letters Patent, is:

1. A draft device comprising a pull-bar, a cross-bar pivoted to said pull-bar, a tree slidable endwise on said cross-bar and a link connecting the pull-bar to said tree for causing said slidable tree to move outward from said pivot on the side of the cross-bar which is moved in advance of said pivot.

2. A draft device comprising a pull-bar, a U shaped cross-bar pivoted to said pull-bar, a tree slidable endwise in said cross-bar and an adjustable link pivoted to said pull-bar and said tree for causing said slidable tree to move outward from said pivot on the side of the cross-bar which is moved in advance of said pivot.

3. A doubletree comprising a pull-bar, a cross-bar pivoted to said pull-bar, a maintree slidable endwise on said cross-bar, a link connecting said pull-bar to said maintree, pull-rods pivoted to the ends of said maintree, and singletrees attached to said pull-rods, whereby when one of said singletrees advances forward of the pivot point said maintree wil move outward on said advance side and inward on the other side.

CLARENCE STEFFEN.